United States Patent [19]

Cowan

[11] 4,150,625

[45] Apr. 24, 1979

[54] OVERHEAD CRANES

[75] Inventor: William G. Cowan, East Kilbride, Scotland

[73] Assignee: J. H. Carruthers & Company Limited, East Kilbride, Scotland

[21] Appl. No.: 789,081

[22] Filed: Apr. 20, 1977

[51] Int. Cl.[2] ........................ B60B 13/04; E01B 25/08

[52] U.S. Cl. .................................... 104/119; 104/120; 212/10

[58] Field of Search ............................ 212/10, 11, 18; 238/134, 144, 148, 127, 128; 105/143, 141, 145; 104/119, 120; 52/179, 177, 731

[56] References Cited

U.S. PATENT DOCUMENTS

| | | | |
|---|---|---|---|
| 380,575 | 4/1888 | Hunter | 238/131 |
| 429,127 | 6/1890 | Gibbon | 238/134 |
| 918,640 | 4/1909 | Allison | 238/134 |
| 3,835,481 | 9/1974 | Engelhart et al. | 52/179 |

FOREIGN PATENT DOCUMENTS

| | | | |
|---|---|---|---|
| 1117278 | 11/1961 | Fed. Rep. of Germany | 104/119 |

*Primary Examiner*—Lawrence J. Oresky
*Attorney, Agent, or Firm*—Lowe, Kokjer, Kircher, Wharton & Bowman

[57] ABSTRACT

In overhead cranes of the kind including a box girder fabricated of elongate plates and torsionally loaded by a trolley running on three rails respectively at three corners of the box girder, the structure of the box girder is usually such that flanges project from the corners thereof and prevent proper support of the rails in optimum corner positions in alignment with the walls of the girder. This problem is now solved by providing a rail with an elongate flange and securing the rail and flange respectively to marginal portions of a pair of adjacent plates of the box girder. In this way the rail can be secured in optimum position at the corner of the girder and forms with the flange a member which encloses the corner flange and serves as a stiffener or reinforcement for the corner. In a preferred construction the rail and flange are the respective arms of a generally V-section elongate member enclosing the corner of the girder.

6 Claims, 2 Drawing Figures

OVERHEAD CRANES

Figure 1:
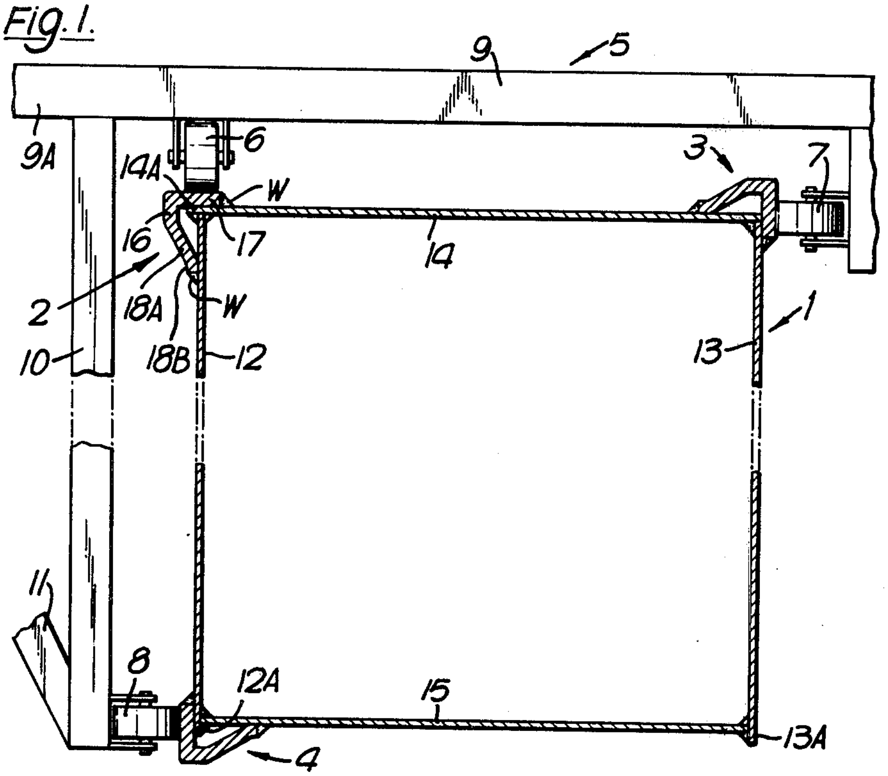

This invention relates to overhead cranes of the kind comprising an overhead box girder, a rail track on the box girder, and a wheeled trolley mounted on the track to convey a load along the box girder.

The invention is particularly but not exclusively concerned with cranes of the aforesaid kind in which the girder is a welded-plate box girder, the rail track includes three rails on the girder at respective corners thereof, and the load-supporting trolley has wheels engaging the three rails so that the trolley is movable along the girder while torsionally loading same. An example of such a three-rail girder structure is described in our earlier U.S. Pat. No. 3,223,248.

Usually each corner joint of the welded-plate box girder of said three-rail structure is formed by butting together an edge face of a first plate and a side face of a second plate at a location spaced inwards from the longitudinal edge of the second plate to leave a corner flange, and fillet-welding the plates together along the junction lines so formed, the corner flange providing support material for welding purposes. A serious disadvantage of this construction is that the flanges forming part of the corner portions of the box girder render it very difficult to provide adequate support for the usual wheel rails with the rails at their optimum locations viz. in alignment with longitudinal edge faces of the plates to obtain the benefit of the shear strength of the plates under edge loading conditions.

Another disadvantage is that it is difficult to provide the corner joints of the girder of such a three-rail structure with the desired angular rigidity by traditional methods of design and manufacture.

The chief object of the present invention is to provide a crane of the aforesaid kind in which the aforesaid disadvantages are obviated or mitigated.

According to the present invention we provide an overhead crane comprising an overhead box girder fabricated of elongate plates and including elongate corner joints each composed of first and second marginal portions of a pair of adjacent elongate plates said marginal portions being so interconnected that the first portion overhangs the second portion to provide a corner flange, a track on the box girder, and a wheeled trolley mounted on the track to convey a load along the box girder, wherein the track includes a rail at one of said corner joints, said rail being connected to the first marginal plate portion of the corner joint and extending laterally outwards beyond the corner flange of the corner joint, and an elongate flange extending laterally from the outer edge of the rail and connected to the second marginal plate portion of the corner joint so that the flange supports the rail and the rail and its supporting flange together enclose the corner joint including the corner flange.

Preferably the track on the box girder includes a longitudinally extending channel member accommodating a corner joint including the corner flange of the girder, one wall portion of the channel member forming the rail and another wall portion of the channel member forming the rail-supporting flange.

It will be appreciated that by providing a channel member of appropriate cross-section the corner flange is readily bridged and the rail located at optimal position whereupon the rail is quickly and easily secured in optimal position by two lines of welding connecting the channel member to the girder. Simultaneously the channel member serves to strengthen the corner joint against displacement under load.

The cross-sectional shape of the channel member is preferably such that the channel member may readily be produced in metal by a rolling process.

In a particularly advantageous embodiment of the invention the track includes rails connected respectively to the first marginal plate portions of the adjacent corner joints and extending laterally outwards beyond the corner flanges of said corner joints, and elongate flanges extending laterally from the outer edges of the rails and connected respectively to the second marginal plate portions of said corner joints so that the flanges support the rails and at each of said corner joints a rail and its supporting flange together enclose the corner joint including the corner flange. Thus, the aforesaid advantageous positioning and support is provided for the rails, while simultaneously the rails and their supporting flanges together serve to strengthen the girder at the corners against torsional displacement under load.

Figure 2:
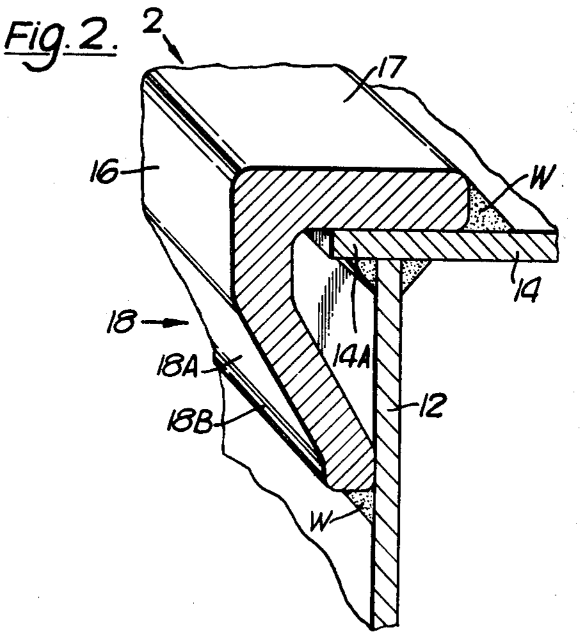

An embodiment of the invention will now be described by way of example with reference to the accompanying drawings in which FIG. 1 is a fragmentary cross-sectional view, and FIG. 2 is a fragmentary top perspective view of the top left-hand corner of FIG. 1. Referring to the drawings:

An overhead crane includes a travelling, overhead, fabricated box girder 1, three identical longitudinally extending generally V-section rolled-metal channel members 2, 3 and 4 on the girder at respective corners thereof viz. the two top corners and a bottom corner, and a trolley 5 for use in hoisting the load and including three sets of wheels, namely vertical load-bearing wheels 6 and horizontal reaction sheels 7 and 8 respectively engaging the channel members 2, 3 and 4 so that the trolley 5 is movable along the girder.

The trolley is composed of a horizontal frame 9 extending across the top of the girder 1 and having an overhanging portion 9A, a vertical frame 10 alongside the girder, and a sloped strut structure 11 extending between the overhanging portion 9A and the frame 10. Hoisting gear (not shown) including a load-lifting hook is mounted on the overhanging portion 9A, and an electric motor (not shown) is mounted on the frame 9 and is drivingly connected to the wheels 6 so that the trolley torsionally loads the girder 1 while traversing same.

The girder 1 is composed of four interconnected elongate plates viz. a pair of laterally spaced upright web plates 12 and 13, and a pair of top and bottom flange plates 14 and 15. The top flange plate 14 rests on the upper longitudinal edge faces of the web plates 12 and 13 and has a longitudinal marginal portion 14A laterally overhanging the web plate 12 to provide a horizontal top corner flange, while the bottom flange plate 15 has its longitudinal edge faces abutting the pair of opposed inner side faces of the web plates 12 and 13 so that longitudinal marginal portions 12A and 13A of the web plates overhang the bottom flange plate 15 to provide vertical bottom corner flanges. As shown in FIG. 1, external and internal lines of fillet welding secure the plates together, the corner flanges providing support for the external fillet welding. Thus, the girder has four elongate corner joints each composed of marginal portions of a pair of adjacent elongate plates and welding interconnecting said marginal portions.

The channel members 2 to 4 enclose or accommodate the corner marginal plate portions of the girder including the corner joint flanges, and each channel member is attached to the pair of adjacent marginal plate portions forming the corner joint by two lines of fillet welding W at the longitudinal edges of the walls of the channel member. Thus the corner joints are concealed by the channel members.

As clearly shown in FIG. 2, each channel member is composed of a base 16 and two side walls 17 and 18. The side wall 17 is at right angles to the base, and the side wall 18 has a main portion 18A disposed at an angle of 60° to the side wall 17 and a short outer marginal portion 18B disposed at right angles to the side wall 17 and aligned with a portion thereof intermediate its outer and inner longitudinal boundaries; the corners of the channel member are radiussed and fileted. At each of the three corner joints, the side wall 17 is disposed in optimal position over an edge face of a girder plate to form a rail extending laterally outwards beyond said plate, while the base 16 and the side wall 18 extend from the outer longitudinal boundary of the rail to the adjacent girder plate so as to form an integral strut supporting the rail in optimal position. The dimensions of the channel member should be such as to ensure that the member will enclose or accommodate the largest corner flanges envisaged in the design of the box girder or range of box girders.

So far as the rails 17 are concerned they should be of a thickness which having regard to the kind of metal will ensure a satisfactory working life therefor. The kind of metal for the channel members should be chosen to provide the best compromise between hardness, that is resistance to wear, and weldability.

In sum, a difficult practical problem of support for the rails of the track is solved by the simple expedient of providing in effect an integral wall or flange on the rail and connecting the resulting channel member to the girder by two lines of fillet welding.

There is thus provided a combination of a welded-plate box girder and rolled metal section which as a composite structure is employed in sustaining a traversing, rolling torsional load. This structure provides:

(a) a system of rail track which is firmly supported with a minimum of parts and welding and which transfers the rolling load to the box girder effectively in the ideal positions viz. over the edge faces of the girder plates such that the plates are loaded in shear, and (b) a corner-reinforcing system which increases considerably the corner stiffness of the girder and thus adds considerably to the resistance of the girder to distortion while under torsional loading.

I claim:

1. An overhead crane comprising an overhead box girder fabricated of elongate plates and including elongate corner joints at least two composed of first and second marginal portions of a pair of adjacent elongate plates said marginal portions being so interconnected that the first portion overhangs the second portion to provide a corner flange, a track on the box girder, and a wheeled trolley mounted on the track to convey a load along the box girder, wherein the track includes a rail at one of said corner joints, said rail being connected to the first marginal plate portion of the corner joint and extending laterally outwards beyond the corner flange of the corner joint, and an an elongate flange extending laterally from the outer edge of the rail and connected to the second marginal plate portion of the corner joint so that the flange supports the rail and the rail and its supporting flange together enclose the corner joint including the corner flange further said track on the box girder includes a longitudinally extending channel member accommodating a corner joint including the corner flange of the girder one wall portion of the channel member forming the rail and another wall portion of the channel member forming the rail-supporting flange, and said channel member is of generally V-section, so that the rail-supporting flange slopes inwards from the rail towards the second marginal plate portion of the corner joint.

2. A crane according to claim 1, in which the channel member is attached to the marginal plate portions of the corner joint by lines of welding at the longitudinal edges of the rail and rail-supporting flange.

3. An overhead crane according to claim 2, wherein the first and second marginal plate portions of each joint are interconnected by welding.

4. An overhead crane comprising an overhead box girder fabricated of elongate plates and including elongate corner joints at least two composed of first and second marginal portions of a pair of adjacent elongate plates said marginal portions being so interconnected that the first portion overhangs the second portion to provide a corner flange, a track on the box girder at corner joints of the box girder, and a wheeled trolley mounted on the track so as to load the box girder torsionally, wherein the track includes rails connected respectively to the first marginal plate portions of the adjacent corner joints and extending laterally outwards beyond the corner flanges of said corner joints, and elongate flanges extending laterally from the outer edges of the rails and connected respectively to the second marginal plate portions of said corner joints so that the flanges support the rails and at each of said corner joints a rail and its supporting flange together enclose the corner joint including the corner flange further said track on the box girder comprises a plurality of longitudinally extending generally V-section members respectively enclosing corner joints of the box girder so that one set of walls of the members form rails and the other set of walls of the members form rail-supporting flanges extending inwardly from the rails to the second marginal plate portions of the corner joints.

5. An overhead crane according to claim 4, wherein the V-section members are attached to the marginal plate portions of the corner joints by welding at the longitudinal edges of the rails and flanges of the members.

6. An overhead crane according to claim 5, wherein the first and second marginal plate portions of each corner joint are interconnected by welding.

* * * * *